March 29, 1949.   H. B. UHL ET AL   2,465,498
PRODUCTION OF FORMALDEHYDE
Filed May 9, 1945
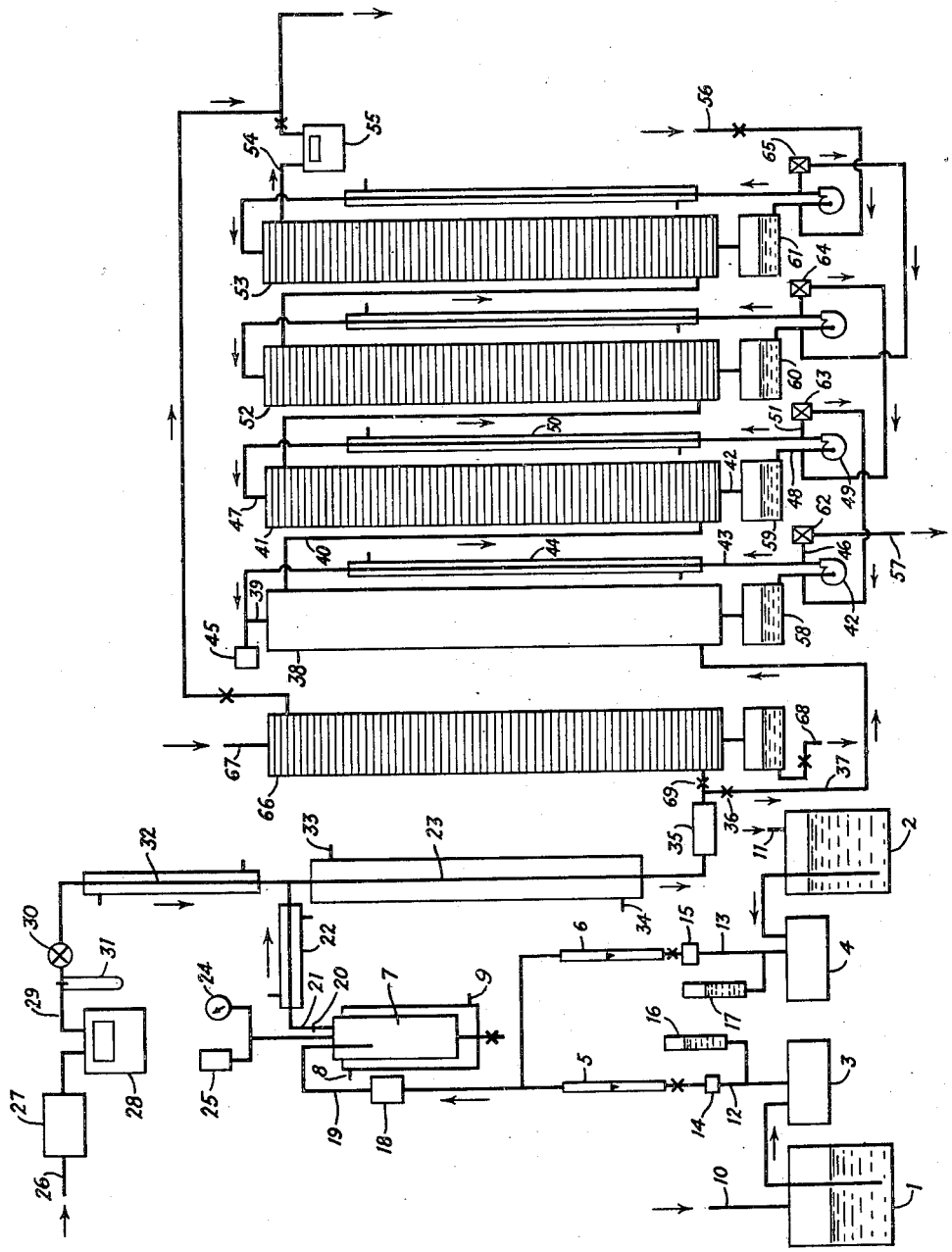
INVENTORS
H. B. Uhl and I. H. Cooper
BY
Ferdinand B. Kopecky
ATTORNEY Patented Mar. 29, 1949

2,465,498

UNITED STATES PATENT OFFICE 2,465,498

PRODUCTION OF FORMALDEHYDE

Herbert B. Uhl, River Edge, and Irving H. Cooper, Maywood, N. J., assignors to Heyden Chemical Corporation, New York, N. Y., a corporation of Delaware Application May 9, 1945, Serial No. 592,760

4 Claims. (Cl. 260—603)

The present invention relates to processes for the production of formaldehyde by the catalytic oxidation or combined oxidation-dehydrogenation of methanol with air and other oxygen-containing gases. In one of its more specific aspects it relates to a process for the combined air oxidation-dehydrogenation of methanol containing added water vapor in the presence of a silver contact catalyst.

Processes for the production of formaldehyde by the oxidation of methanol with air in the presence of silver contact catalysts are generally known and various such processes have been described, for example, in the book by J. Frederic Walker, "Formaldehyde," Reinhold Publishing Corp., New York, 1944; in Sir Edward Thorpe's "A Dictionary of Applied Chemistry," Longmans, Green and Co., London, 1918, vol. II, pages 592-596; and in the article by H. W. Homer, J. Soc. Chem. Ind., 1941, vol. 60, pages 213-18. In such processes a mixture of methanol and air is passed over a heated mass of silver contact catalyst and formaldehyde is recovered from the effluent gases.

It is an object of the present invention to provide an improved process for the production of formaldehyde by the catalytic oxidation of methanol.

A further object of the invention is to provide a process for improving the yield of formaldehyde obtained in the catalytic oxidation of methanol.

A further and more specific object of the invention is to provide a process for improving the yield of formaldehyde obtained from methanol in a process for the catalytic oxidation of methanol in the presence of a silver catalyst in which process the methanol is recovered either partially or completely and recycled for the production of additional quantities of formaldehyde.

Other objects and advantages of the invention, some of which are referred to specifically hereinafter, will be apparent to those skilled in the art to which the invention pertains.

Heretofore, dry as well as wet methanol has been used as a charging stock for the production of formaldehyde by catalytic oxidation. As early as 1903, in experiments involving the oxidation of methanol with air by passing a mixture of the two over a heated incandescent platinum spiral, A. Trillat (Bull. soc. chim., 1902, Series 3, vol. 27, pages 797–803; ibid., 1903, Series 3, vol. 29, pages 35–47) concluded that the addition of water vapor to the methanol favored the reaction. He found that, with an approximate proportion of 20% of water, the temperature at which incandescence of the platinum spiral was produced reached a minimum of 175° C. Subsequent investigators studied other effects of the additions of water vapor to methanol and air mixtures.

Moyer Delwyn Thomas (J. Amer. Chem. Soc., 1920, vol. 42, page 867) found that silver metal was one of the best catalysts for the oxidation and found that the yield of formaldehyde was increased by the addition of 5% water by weight to the methanol and was decreased by the addition of 10% by weight of water. Hirchberg in British Patent No. 199,760 referred to some improvements which result, in the presence of a copper catalyst, when water is used in amounts within the range of $1/9$ to $1/24$ by weight of the methanol. Dreyfus in U. S. Patent No. 2,086,702 refers to improvements in the oxidation of ethanol to acetaldehyde in the presence of a silver catalyst when water in an amount equal to the weight of ethanol employed, and preferably at least twice the weight, is used. In U. S. Patent No. 2,111,584, Eversole found that up to 14% of water charged with the methanol produced an increased yield of formaldehyde in the dehydrogenation of methanol in the presence of a copper catalyst and in the absence of air or oxygen.

As disclosed in the art cited hereinabove, the principal object of the respective investigators appeared to be that of obtaining a maximum conversion of formaldehyde in each passage of the methanol through the catalytic reaction zone. When methanol is oxidized, however, formaldehyde is not the sole product. Other oxidation products which may be formed include formic acid, carbon monoxide and carbon dioxide, none of which, if recovered, can be converted to formaldehyde by oxidation in a recycling or second conversion step. Hence, as far as the process of converting methanol to formaldehyde is concerned, such secondary oxidation products are valueless. In the process of the preesnt invention the objective is not only that of obtaining the highest possible conversion per pass of methanol to formaldehyde but also that of obtaining as high a conversion of formaldehyde per pass as possible while at the same time maintaining the proportion of secondary oxidation products at a minimum. It is thus readily apparent that a process with such an objective possesses definite advantages from an economic standpoint. In the production of a substance that is produced in such vast quantities as is formaldehyde, an improvement of only 1% or so in yield may be an improvement of great economic magnitude.

In accordance with the process of the present invention, methanol containing from approximately 20% to approximately 40% by weight of water (based on the weight of methanol) and preferably from approximately 30% to approximately 40% are passed together with air or other oxygen-containing gas into contact with an oxidation catalyst such as silver. The actual conversion of methanol to formaldehyde is below the optimum and is generally slightly less than is obtained when no water or less than 20% water is used in the process, but the proportion of methanol in the product is greater in relation to secondary oxidation products. Thus, within the range of 20% to 40% water based on the weight of methanol, which is a range quite different from the optimum points or ranges investigated or found by others, it is possible to restrict the formation of secondary oxidation products that are valueless and represent a loss in the process.

As far as known, the action of the water that is added or charged with the methanol in accordance with the process of the invention is not simply that of a diluent nor is the effect simply one that can be explained on the basis of the mass-action law, since the reactions involved are numerous and complex. Substitution of other diluent gases for water vapor does not produce similar results nor does the substitution of oxygen or gases containing greater or smaller amounts of oxygen than is contained in air, provided the same amounts of oxygen and water are used, appear to have any substantial effect on the yields of the various products. Furthermore, the improvement is not solely the result of the lowering of the reaction temperature which occurs when water is charged in accordance with the process of the invention. Apparently all of these and other factors are involved in a complex manner.

Although silver is the preferred catalyst and has been extensively investigated, other solid oxidation contact catalysts, such as silver-copper-zinc alloys and other silver-containing catalysts, may be used.

Although it is preferred to operate within the ranges of temperatures and flow rates specified hereinafter, in order to obtain optimum or maximum yields of formaldehyde per pass while controlling the formation of secondary oxidation products, other reaction temperatures and flow rates may be used with similar advantageous results, which are an improvement over the results obtained when the methanol is charged without the specified proportion of water vapor. The process of the present invention, in which consideration is given to both the formaldehyde conversion and the recoverable methanol, is not as generally sensitive to changes in reaction temperatures and flow rates as are processes operated in the absence of water, in which the sole consideration is the formaldehyde conversion per pass. In this respect it is to be noted that under the reaction conditions used by M. D. Thomas, loc. cit., an optimum formaldehyde conversion per pass was obtained at approximately 5% water vapor concentration.

In practicing the process of the present invention an apparatus or plant such as that represented in the accompanying drawing may be used. In practicing such process, methanol from reservoir 1 and water from reservoir 2 are charged in the desired proportions by means of pumps 3 and 4, respectively, which may be pumps of the Hills-McCanna type, through rotameters 5 and 6, respectively, or through other suitable flow-measuring devices into a vaporizing chamber 7, which is heated externally, for example, by means of steam charged through inlet 8 and vented through outlet 9. The methanol and water reservoirs 1 and 2, respectively, may be maintained under moderate pressures to provide a positive feed to the respective pumps 3 and 4, by means of compressed air applied at inlets 10 and 11, respectively. In the charge conduits or lines 12 and 13 to the rotameters 5 and 6, check or feed-control valves 14 and 15 and surge domes 16 and 17, respectively, may be used to provide smooth fluid flow to the vaporizing chamber 7. In operation, the pressure applied to the water and methanol reservoirs 1 and 2 through inlets 10 and 11 may be in the proximity of 5 pounds per square inch gauge and the pressure at the check valves 14 and 15 and surge domes 16 and 17 may be approximately 35 pounds per square inch gauge. A mixing chamber 18 may be provided, if desired, in the conduit or line 19 connecting with vaporizing chamber 7, although this is normally not necessary.

The pressure in the vaporizing chamber 7 may be maintained at approximately 15 to approximately 20 pounds per square inch gauge by means of a restricting orifice 20 in outlet conduit or line 21, which conducts the mixed methanol-water vapor through a heater 22 into vapor-mixing chamber 23. The vaporizing chamber 7 is preferably provided with a pressure gauge 24 and a safety valve or blowout disc 25.

Air for mixing with the methanol-water vapor in vapor-mixing chamber 23 is charged at inlet 26. A drier filled with calcium chloride or other suitable drying agent or desiccant may be used in the event that the charged air is of variable or indeterminate moisture content or if operation with dried air is desired. A gas-volume recorder or meter 28 may be inserted, if desired, in the air conduit or line 29. The rate of flow of air in conduit 29 is controlled by valve 30 and is measured by flowmeter 31, which may be of any suitable conventional type. Before entering vapor-mixing chamber 23 the air may be preheated to a desired temperature by means of a heat-exchanger 32. Normally in operation the air enters the vapor-mixing chamber 23 at a temperature within the range of approximately 100° to approximately 150° C. and the methanol-water mixture enters at approximately the same temperature.

Vapor-mixing chamber 23 is maintained at a desired temperature by means of heat exchange with steam or other fluid which is circulated from inlet 33 to outlet 34. Usually the temperature is maintained at approximately 150° C. or above the dew point to prevent precipitation of the methanol and water from the methanol-water-air mixture and to provide the mixture in vapor form at a suitable temperature for charging to the burner or catalyst chamber 35.

The catalyst chamber 35 is filled with particles of a suitable catalyst such as silver metal particles or screens and is of such size that when filled or charged with catalyst it provides the desired degree of oxidation of the charged methanol-water-air mixture. Normally the temperature of the vapor mixture at the inlet of the catalyst chamber is of much less importance than the composition of the charged methanol-water-air mixture. Preferably the mixture is charged at a temperature as close to the dew point as possible. The reaction, which is highly exothermic, normally provides sufficient heat to maintain the catalyst at the desired reaction temperature, which is generally within the range of approximately 500° to 650° C. and preferably within the range of 540° to 580° C., as measured at the catalyst chamber outlet. The temperature of the catalyst chamber and of the exit gases may be controlled conveniently by adjustment of the composition of the charge stock and the flow rate, but the catalyst reaction zone may be insulated or cooled by heat-exchange or otherwise to maintain the desired reaction temperature.

After leaving the catalyst chamber 35 the effluent gases are scrubbed with water, preferably in a series of towers operating in such manner that the most concentrated scrubbing liquid comes into contact with the fresh gases. The gases from the catalyst chamber 35 pass through valve 36 and conduit or line 37 into spray tower 38, which is an unpacked tower, in which they are washed with scrubbing liquor charged at the top of the tower through conduit 39.

The uncondensed or unabsorbed vapor passes from the top of the spray tower 38 through conduit 40 to the bottom of the second tower in the series 41, which may be and preferably is packed with an inert granular solid such as Raschig rings or Carborundum or similar column-packing materials. The effluent liquor from the bottom of tower 38 is charged by means of a centrifugal pump 42 or other suitable means through conduit or line 43, through a cooling condenser 44, back to the top of spray tower 38 through conduit or line 39.

In order to prevent the temperature of the circulating scrubbing liquor from dropping too low, whereby paraformaldehyde may precipitate from the liquor, a suitable temperature controller 45 may be provided to regulate or adjust the flow of cooling water to cooling condenser 44. The product is removed from the bottom effluent of spray tower 38 through conduit or line 46, preferably automatically by means described hereinafter.

The vapors in packed column 41 are scrubbed with scrubbing liquor charged at the top of the column through conduit or line 47. The bottom effluent of column 41 passes through conduit or line 48 and, by means of a centrifugal or other suitable pump 49, is charged partly through cooling condenser 50 through conduit 47 into the top of column 41, and partly through conduit 51 to the top of column 38, through pump 42, cooling condenser 44, and conduit 39.

In a similar manner, the unabsorbed gases at the top of column or tower 41 are charged to the bottom of tower 52, in which they are scrubbed and the gases unabsorbed in said tower 52 are charged to the bottom of tower 53 in the series. Nitrogen, hydrogen, carbon dioxide and small amounts of noncondensible vapors and any other gases unabsorbed and remaining at the top of column 53 are discharged or drawn off through conduit or line 54.

In conduit or line 54, it is desirable to have a recording gas-volume meter 55. Preferably a vacuum pump is applied to the outlet of conduit or line 54 to maintain the desired reduced pressure throughout the system and aid in control of the flow of air through the system. Any suitable source of vacuum, such as a steam jet, water-aspirator or mechanical pump may be used for this purpose.

Pure water, which is generally condensate from a steam jet or other source, is charged to the absorption system or series of towers through conduit 56. The water is charged continuously and in such amount as to provide a product at outlet 57 having the desired formaldehyde concentration. The levels of the liquids at the bottom reservoirs 58, 59, 60 and 61 of each of the towers may be automatically maintained constant by means of photoelectric cells mounted on each of the reservoirs which actuate solenoid valves 62, 63, 64 and 65.

In starting up a run, the forerunnings may be absorbed and disposed of in a by-pass tower or column 66, in which water is charged at inlet 67 and discarded at 68. Tower or column 66 is preferably a packed column such as column 41. When the catalyst operation has become steady and stabilized, valve 69 may be closed and valve 36 opened and the product scrubbed as described hereinabove. This by-pass tower or column 66 is not necessary in a commercial unit.

It is to be understood that the hereinabove described apparatus or plant and the described method of operation are purely schematic and illustrative and that the use of auxiliary pumps, temperature measuring, recording and controlling devices, pressure recorders and controllers, heat-exchangers and other auxiliary equipment are contemplated and may be provided without departing substantially from the process of the invention and that the process may be modified in manners known to the art. Four towers are represented in the absorption system but fewer or more than this number may be used, as is desired. The recovered formaldehyde solution may be separated from methanol as described in Reynolds Patent No. 2,256,497.

Preferred methods of practicing the process of our invention are described hereinafter. These methods and results are merely illustrative, however, and are not to be understood to be limitative or restrictive of the scope of the invention.

An apparatus similar to that described hereinabove and in the drawing having a copper catalyst tube was packed with a silver contact catalyst mass. Various mixtures of methanol and water vapor were charged to the catalyst tube together with a constant proportion of air that had been dried by passage through calcium chloride. The rates of flow of the methanol and dry air were maintained constant throughout the series, being respectively 0.158 pound of methanol per minute and 2.76 cubic feet of air per minute (converted to 0° C. and a pressure of 760 mm. of mercury). The amounts of water charged were varied. The space velocities, computed as cubic feet of gas (measured at S. T. P., i. e, 0° C. and 760 mm.) per second divided by cubic feet of catalyst, varied according to the percentage of water charged.

In the table which follows is given the approximate volumetric composition of the vapor charged to the catalyst tube or chamber. The mixed methanol-water-air mixture was charged to the catalyst chamber at approximately 150° C. The temperature of the effluent product vapors in each case was different, as indicated in the table, and varied from 545° to 583° C. The removal of formaldehyde from the effluent product vapors by scrubbing was conducted substantially to completion in each case.

| No. | Water added, percent by weight based on methanol charged | Vapor Composition, percent by volume | | | Reaction Gas Temperature (at Catalyst Chamber Outlet) | Formaldehyde Yield | | Percent Methanol Recovered | Space Velocity [1] | Percent Methanol Lost as Non-condensable Gases |
| --- | --- | --- | --- | --- | --- | --- | --- | --- | --- | --- |
| | | Methanol | Water | Air | | Percent Methanol Converted to Formaldehyde | Percent Methanol Converted to Formaldehyde Based on Methanol Oxidized | | | |
| 1 | 0  | 39.0 | 0    | 61.0 | 583 | 74.1 | 87.7 | 15.5 | 37.6 | 10.4 |
| 2 | 10 | 36.5 | 6.7  | 56.8 | 576 | 75.1 | 88.7 | 15.4 | 39.1 | 9.5 |
| 3 | 15 | 35.4 | 9.5  | 55.1 | 573 | 75.4 | 89.2 | 15.5 | 39.9 | 9.1 |
| 4 | 20 | 34.1 | 13.0 | 52.9 | 569 | 75.4 | 89.7 | 16.0 | 40.6 | 8.6 |
| 5 | 25 | 33.5 | 14.8 | 51.7 | 565 | 75.2 | 90.1 | 16.5 | 41.3 | 8.3 |
| 6 | 30 | 32.4 | 16.9 | 50.7 | 560 | 74.4 | 90.5 | 17.8 | 42.0 | 7.8 |
| 7 | 35 | 31.4 | 19.5 | 49.1 | 555 | 73.4 | 90.6 | 19.0 | 42.7 | 7.6 |
| 8 | 40 | 30.6 | 21.6 | 47.8 | 551 | 72.5 | 90.3 | 19.7 | 43.3 | 7.8 |
| 9 | 45 | 29.8 | 23.8 | 46.4 | 545 | 71.5 | 89.2 | 19.9 | 44.2 | 8.6 |

[1] Space velocity = $\dfrac{\text{cu. ft. gas per sec. at S. T. P.}}{\text{cu. ft. catalyst}}$ In the foregoing table, in the column labelled "Formaldehyde yield," the first column thereof, namely, "per cent methanol converted to formaldehyde," the values entered represent the percentage by weight of methanol charged through the catalyst tube that was found in the products as formaldehyde. The values entered in the second column under the heading "Formaldehyde yield," namely, "per cent methanol converted to formaldehyde based on methanol oxidized," represent the weight of methanol converted to formaldehyde based on the formaldehyde found in the products divided by the difference between the weight of methanol charged and the weight of unoxidized methanol found in the products. Thus, if 100 pounds of methanol were charged and the product contained formaldehyde equivalent to 75 pounds of methanol and 15 pounds of unoxidized methanol, the per cent methanol converted to formaldehyde based on methanol oxidized is 75 × 100/(100−15) or 7500/85 or 88.2%.

It is to be noted, from the results in the foregoing table, that the addition of 10% by weight of water to the methanol (1 compared with 2) produces a substantial improvement in per cent methanol converted to formaldehyde and a substantial improvement in per cent methanol converted to formaldehyde based on methanol oxidized, whereas the addition of 15% and 20% by weight of water to the methanol (3 and 4 compared with 2) produces less of an improvement in per cent methanol converted to formaldehyde but produces a still further but smaller improvement in the per cent methanol converted to formaldehyde based on methanol oxidized. The addition of 25% by weight of water to the methanol (5 compared with 4) produces a decrease in per cent methanol converted to formaldehyde but a further increase in per cent methanol converted to formaldehyde based on methanol oxidized. The addition of 30%, 35% and 40% by weight of water to the methanol (6, 7, 8 compared with 4) produces a decrease in per cent methanol converted to formaldehyde but produces a substantial and optimum improvement in per cent methanol converted to formaldehyde based on methanol oxidized. The values in the respective runs for per cent loss of methanol as noncondensable gases is smallest between 30% and 40% by weight of water added to the methanol (6 to 8).

Although the process of the invention is referred to herein and in the claims as a catalytic oxidation, the mechanism thereof may be both catalytic oxidation and partial catalytic dehydrogenation. The ratio of air to methanol that was used in the foregoing series of runs represents a preferred embodiment of the invention, and corresponds to approximately 65% of the oxygen stoichiometrically required for oxidation of all the methanol to formaldehyde. The process contemplates the use of such amounts or ratios of air or other oxygen-containing gases which will provide and maintain the desired reaction temperature. Generally this amount will be within the range of approximately 30% to approximately 90%, and preferably from 45% to 75%, of the oxygen stoichiometrically required for complete oxidation of all the methanol charged. It is to be understood, however, that the catalyst may be maintained at the desired reaction temperature by other conventional means.

It is one of the advantages of the invention that, by adding water to the methanol charged, the rates of charging of air or of methanol need not be changed. A unit operating at maximum capacity with a certain catalyst at a certain charging rate of methanol and a certain charging rate of air may be operated at these same charging rates when water is added to the methanol. The limiting factor in the operation of any catalyst chamber is an economic one, namely, the yield of formaldehyde or conversion of methanol to formaldehyde. Normally the amount of methanol that is charged per unit of time is much less than could be passed through the catalyst chamber were it not necessary to produce an optimum formaldehyde yield. A normal unit can accordingly accommodate the additional water required for practicing the process of the present invention without necessity for substantial redesigning or for changes in charging rates of methanol and air.

In the production of formaldehyde solution of U. S. P. XII strength (containing not less than 37 per cent of $CH_2O$), it is advantageous to use approximately 30% to approximately 40% by weight of water based on the methanol charged, in practicing the process in accordance with the present invention.

Although the methanol may be partially or completely recovered from the products and the recovered methanol recycled together with water and air or other oxygen-containing gas for the production of additional formaldehyde, this is not necessary. Normally in the production of formaldehyde solution, methanol is added to the product to stabilize it. The formaldehyde solution produced according to the process of the present invention, which contains a greater proportion of methanol than that normally found in products produced by the catalytic oxidation of dry methanol or methanol without the addition of the specified amounts of water, does not require the addition of as much methanol to bring it to the desired methanol concentration.

Inasmuch as the foregoing specification comprises preferred embodiments of our invention, it is to be understood that the invention is not limited thereto, and that modifications and variations may be made therein without departing substantially from the scope of the invention or the appended claims.

We claim:

1. A process for the production of formaldehyde by the catalytic oxidation of methanol with air which comprises passing methanol together with water equal to from approximately 20 per cent to approximately 40 per cent by weight of the methanol together with an amount of air in such amount that the oxygen in said air is approximately 65 per cent of that stoichiometrically required to oxidize all the methanol to formaldehyde into contact with a silver contact catalyst at a reaction temperature within the range of approximately 540° to approximately 580° C.

2. A process for the production of formaldehyde by the catalytic oxidation of methanol with air which comprises passing methanol together with water equal to from approximately 30 per cent to approximately 40 per cent by weight of the methanol together with air in such amount that the oxygen in said air is approximately 65 per cent of that stoichiometrically required to oxidize all the methanol to formaldehyde into contact with a silver oxidation catalyst at a reaction temperature within the range of approximately 540° to approximately 580° C. and recovering formaldehyde from the reaction products.

3. A process for the production of formaldehyde by the catalytic oxidation of methanol with air which comprises passing methanol together with water equal to from approximately 20 per cent to approximately 40 per cent by weight of the methanol together with air in such amount that the oxygen in said air is approximately 65 per cent of that stoichiometrically required to oxidize all the methanol to formaldehyde and at such rates that the flows of the methanol and air to the catalytic reaction zone are in the ratio of 0.158 pound of methanol per minute to 2.76 cubic feet of air at 0° C. and 760 mm. per minute into contact with a silver oxidation catalyst at a reaction temperature within the range of approximately 540° to approximately 580° C. and recovering formaldehyde from the reaction products.

4. A process for the production of formaldehyde by the catalytic oxidation of methanol with air which comprises passing methanol together with water equal to from approximately 30 per cent to approximately 40 per cent by weight of the methanol together with air in such amount that the oxygen in said air is approximately 65 per cent of that stoichiometrically required to oxidize all the methanol to formaldehyde into contact with a silver oxidation catalyst at a reaction temperature within the range of approximately 540° to approximately 580° C. and recovering formaldehyde and a portion of the unoxidized methanol from the reaction products and recycling the methanol together with additional water and air to the catalytic reaction zone.

HERBERT B. UHL.
IRVING H. COOPER.

REFERENCES CITED

The following references are of record in the file of this patent:

UNITED STATES PATENTS

| Number | Name | Date |
| --- | --- | --- |
| 868,320 | Blackmore | Oct. 15, 1907 |
| 1,213,740 | Calvert | Jan. 23, 1917 |
| 1,764,962 | Lacy | June 17, 1930 |

FOREIGN PATENTS

| Number | Country | Date |
| --- | --- | --- |
| 199,760 | Great Britain | June 22, 1923 |
| 502,725 | Great Britain | Mar. 24, 1939 |